United States Patent
Boguraev et al.

(10) Patent No.: US 9,454,603 B2
(45) Date of Patent: Sep. 27, 2016

(54) SEMANTICALLY AWARE, DYNAMIC, MULTI-MODAL CONCORDANCE FOR UNSTRUCTURED INFORMATION ANALYSIS

(75) Inventors: Branimir K. Boguraev, Hawthorne, NY (US); Youssef Drissi, Yorktown Heights, NY (US); David A. Ferrucci, Hawthorne, NY (US); Paul T. Keyser, Hawthorne, NY (US); Anthony T. Levas, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 560 days.

(21) Appl. No.: 12/851,926

(22) Filed: Aug. 6, 2010

(65) Prior Publication Data

US 2012/0036478 A1 Feb. 9, 2012

(51) Int. Cl.
*G06F 17/30* (2006.01)
*G06F 17/27* (2006.01)

(52) U.S. Cl.
CPC ... *G06F 17/30731* (2013.01); *G06F 17/30684* (2013.01); *G06F 17/2785* (2013.01); *G06F 17/30696* (2013.01)

(58) Field of Classification Search
CPC ............... G06F 17/30731; G06F 17/30696; G06F 17/2785; G06F 17/30734; G06F 17/30268; G06F 17/30663; G06F 17/30684
USPC ................. 715/821, 810, 825; 707/723, 766
See application file for complete search history.

(56) References Cited

U.S. PATENT DOCUMENTS

| | | | |
|---|---|---|---|
| 6,701,305 B1 | 3/2004 | Holt et al. | |
| 7,310,642 B2 | 12/2007 | McConnell et al. | |
| 7,392,238 B1 | 6/2008 | Zhou et al. | |
| 7,554,467 B2 | 6/2009 | Thomas | |
| 2005/0010561 A1* | 1/2005 | de Bois et al. | 707/3 |
| 2005/0065773 A1* | 3/2005 | Huang et al. | 704/7 |
| 2005/0149510 A1* | 7/2005 | Shafrir | 707/3 |
| 2005/0203900 A1* | 9/2005 | Nakamura | G06F 17/30675 |
| 2010/0036797 A1* | 2/2010 | Wong et al. | 706/55 |
| 2010/0228693 A1* | 9/2010 | Dawson et al. | 706/12 |
| 2011/0173103 A1* | 7/2011 | Batra et al. | 705/29 |

OTHER PUBLICATIONS

Cooper, James W. and Byrd, Roy J., "Lexical Navigation: Visually Prompted Query Expansion and Refinement", RC 20874, May 7, 1997.*
Youssef Drissi, et al., "A Development Environment for Configurable Meta-Annotators in a Pipelined NLP Architecture", Proceedings of LREC-2008, International Conference on Language Resources and Evaluation, Marrakech, Morocco, May 2008.
Tien N. Nguyen, et al., "The Software Concordance: A new Software Document Management Environment", SIGDOC '03, Oct. 12-15, 2003, San Francisco, CA.
Jingwei Wu, et al., "A Multi-Perspective Software Visualization Environment", IBM Centre for Advanced Studies Conference, Proceedings of the 2000 conference of the Centre for Advanced Studies on Collaborative Research, Mississauga, Ontario, Canada.
Whittaker, et al., "Design and evaluation of systems to support interaction capture and retrieval", Pers Ubiquit Comput (2008) 12:197-221.

* cited by examiner

*Primary Examiner* — Steven Sax
*Assistant Examiner* — Christopher J Fibbi
(74) *Attorney, Agent, or Firm* — F. Chau & Associates, LLC

(57) ABSTRACT

An apparatus includes a data processing system for generating and displaying a semantic type concordance. The data processing system includes memory storing a computer program, a display to display data of a concordance generated by the program, and a processor configured to execute the computer program. The computer program includes instructions for displaying a user interface configured to enable a user to select semantic types and specify at least one text document, generating a concordance of the at least one document based on the semantic types, and displaying data of the generated concordance on the display.

14 Claims, 6 Drawing Sheets

Automobiles_Mon_Nov_30_16_24_24_ES_2009

Concordance of Automobiles_Mon_Nov_30_16_24_24_EST_2009

☑ Show the Filters

Documents

[Select All] [Deselect All]

☑ autosite001.txt
☑ autosite002.txt
☑ autosite003.txt
☑ autosite004.txt

Concepts

[Select All] [Deselect All]

☑ Car
☐ CarSentiment
☐ Sertment

| Document | | Left context | Keyword | Right context |
|---|---|---|---|---|
| caranddriverC13.txt | Car: | | Toyota | Honda, and the others. |
| motortrendJ05.txt | Car: | | Toyota | Nissan are now the kings of mid size with the |
| motortrendJ1C.txt | Car: | Sound: I think you're one of few car/non- | truck | enthusiasts who describe diesel sound |
| autosite019.txt | Car: | — I've been wit the dealership/ | Ford | for almost a year trying to get |
| caranddriverC16 | Car: | Anyway, how many Ford GM, Dodge, VW/ | Audi, | and Nissan dealers are there at any |
| caranddriverC16.txt | Car: | @ 30,000 | vehicles | out of the millions they sell... |
| edmund004.txt | Car: | I have a 1999.55, OL | Jetta | with the 2000-current year model |
| edmund009.txt | Car: | — bought a 2002 | Jetta | in Nov 05 |
| edmund002.txt | Car: | Lastly (for now), you paid $14,000 for a 2002 | Jetta | ????? |
| edmund007.txt | Car: | insurance company ran it, it comes back 2002 | VW Jetta GLS | no: M1 4D, and when I pop the hood |
| edmund001.txt | Car: | My 2002 | jetta | and I have |
| edmund014.txt | Car: | switches, chrome, and wood trim in their $30k | sedans | |
| motortrendJ08.txt | Car: | '55 Bentley Continental X-Type or a '72 | Ferrari Daytona | compared to the Tundra |
| caranddriverC14.txt | Car: | think that if they had replaced the 1992-95 | Taurus | with the 2000-current styled model |
| edmund005.txt | Car: | Ask around BEFORE buying a | car, | Automatic and VW are2 things that |
| edmund005.txt | Car: | takes is a little research before buying a | car | to save a lot of $$$. Buying from some |
| motortrendJ1C.txt | Car: | torque than a BMW M3, Nissan 350Z and even a | Ford F150 | with a 4.6L V8 engine. |
| autosite001.txt | Car: | I have been looking for a | car | that my mother would not have to sit |
| motortrendJ01.txt | Car: | if you were able to get a | Civic Si | though that would be my choice |

Concordance of BlueJ-08 Thu Mar 12 11 12 37 EDT 2009 — 506

Documents
Select All | Deselect All
☑ 08k.clues

Concepts — 507
Select All | Deselect All
☐ ☐ AdP Annotation
☐ ☐ ArtsonAnnotation
☐ ☑ Artist — 505
  ☑ Actor
  ☑ Author
  ☑ Director
  ☑ Painter
  ☑ Playwright
  ☑ Poet
  ☑ Screenwriter
☐ ArtRelation Annotation

| | | | |
|---|---|---|---|
| 00k..clues | Actor: | Jon voight and | Burt Reynolds head to Appalachia for |
| 08k..clues | Actor: | L = Line film in in which Tom played | Dan Aykroyd 's police partner Feb su |
| 08k..clues | Actor: | | Doris Day 's most "negative" film tim |
| 08k..clues | Actor: | adaption of "Les Miserables" | Geoffrey Rush 's Davert pursues this |
| 08k..clues | Actor: | Commercial fisherman | George Clooney faces disaster in th |
| 08k..clues | Actor: | e. Adjani played this sculptress; | Gerard Depardieu played her lover |
| 00k..clues | Actor: | On May 31, 1945 | Humphrey Bogart married her |
| 08k..clues | Actor: | In a 1900 film | Isabelle Adjani played this sculpture |
| 08k..clues | Actor: | | Jon Voight and Burt Reynolds head t |
| 08k..clues | Actor: | In the movie which his fourth wife, | Lauren Becall |
| 08k..clues | Actor: | | Lynn FonLenne |
| 08k..clues | Actor: | | Massimo Truisi |
| 08k..clues | Actor: | film less post in where | Meryl Streep and her son go not so |
| 08k..clues | Actor: | His friendship with | Robin Williams landed him a part as |
| 08k..clues | Actor: | This 1990 | Robin Williams tearjerker is based on |
| 08k..clues | Artist: | science where you join a chapter of | AI this organization |

SEMANTICALLY AWARE, DYNAMIC, MULTI-MODAL CONCORDANCE FOR UNSTRUCTURED INFORMATION ANALYSIS

BACKGROUND

1. Technical Field

The present disclosure relates to generating and displaying a concordance of text.

2. Discussion of Related Art

A Keyword-in-Context (KWIC) Concordance is a listing of some or all of the words in a text or set of texts, surrounded by the text that they are embedded within. The display of the surrounding text (e.g., referred to as a context) enables a user to better understand how the corresponding word is used. A concordance enables a user to determine how words are used in a language, and acquire a deeper understanding of their meaning and usage than can be obtained from a dictionary. For example, while the words tan and auburn can both be used to indicate a brownish hue, a dictionary would not reveal that auburn is used frequently to describe hair color, while tan is used frequently to describe skin color. A KWIC Concordance derived from text of a corpus of documents can display the occurrences of these words and their context, thereby enabling one to infer the use of the words, and how these usages may be limited to specific situations.

A KWIC-based display may suggest that "change" and "display" are common word collocations in a given domain (e.g., that of software applications). However, if one wants to discover that 'Works-of-letters' are typically "written", that 'Authors' do the "writing", and that 'Actors' "perform", a conventional KWIC display will not help. For example, concepts such as 'Author' or 'Actor' can be referred to (e.g., mentioned) in a text in numerous ways, e.g., by mentioning the names of particular authors or actors. However, in a KWIC concordance framework, there is no way to aggregate each mention of these to examine, for example, all the different types of verbs that they are collocated with. While Mark Twain wrote "Tom Sawyer", Upton Sinclair authored "The Jungle", and Whitman penned poetry, the similarities underlying these statements do not become apparent with KWIC-based display. For example, a conventional concordance can not determine that the verbs "to write", "to author", "to pen", and so forth collocate 'to the right' of for example, the words denoting the concept of 'Author'.

BRIEF SUMMARY

According to an exemplary embodiment of the present invention, an apparatus includes a data processing system for generating and displaying a semantic type concordance. The data processing system includes memory storing a computer program, a display to display data of a concordance generated by the program, and a processor configured to execute the computer program. The computer program includes instructions for displaying a user interface configured to enable a user to select semantic types and specify at least one text document, generating a concordance of the at least one document based on the semantic types, and displaying data of the generated concordance on the display.

According to an exemplary embodiment of the present invention, a method of generating and displaying a semantic type concordance in a data processing system includes prompting, by a user interface of the data processing system, a user to select a semantic type and at least one text document, determining, by the data processing system, textual strings that correspond to the semantic type, searching, by the data processing system, the documents for occurrences of the textual string, and displaying, on a display of the data processing system, each occurrence of the textual string along with at least one neighbouring word that precedes or follows the textual string as a concordance.

According to an exemplary embodiment of the present invention, a method of generating and displaying a semantic type concordance in a data processing system includes prompting, by a user interface of the data processing system, a user to select at least two semantic subtypes, at least one logic operator, and at least one text document, determining, by the data processing system, textual strings that correspond to a semantic type defined by the semantic subtypes and the logical operators, searching, by the data processing system, the documents for occurrences of the textual strings, and displaying, on a display of the data processing system, each occurrence of the textual string along with at least one neighboring word that precedes or follows the textual string as a concordance.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 4 shows an embodiment of a multi-modal display of correlated instances of semantic annotations according to an exemplary embodiment of the present invention;

FIG. 5 shows an embodiment of a multi-modal display of correlated instances of semantic annotations with semantic subtypes according to an exemplary embodiment of the present invention.

DETAILED DESCRIPTION

Figure 1:
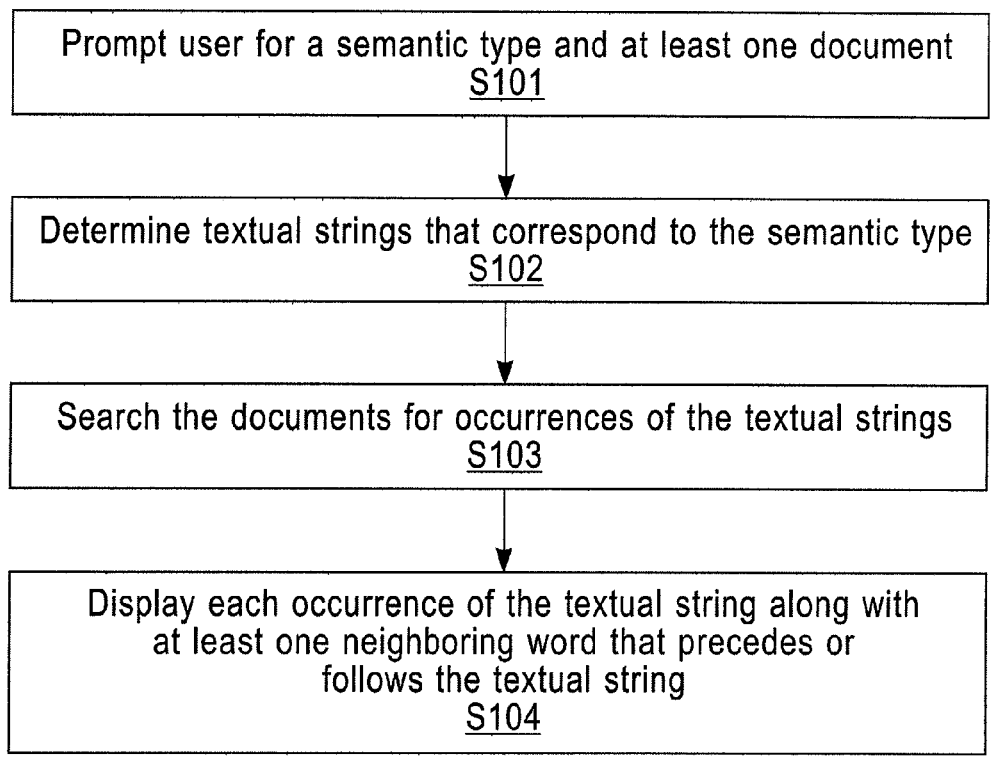
FIG. 1 illustrates a method of generating and displaying a semantic type concordance according to an exemplary embodiment of the invention.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A semantic type encapsulates a set of properties and characteristics common to a number of entities (e.g., expressed by different words) and has a corresponding 'type label' (e.g., a semantic label), with which the semantic type can be referred to. The semantic type may be used to denote something which can only be described by a combination of more than one word. For example, in a particular domain description, for a particular application, a semantic type having a type label of 'User' could refer to "computer users who have Lotus Notes installed as their primary mail application". A semantic type is not considered a keyword and instead typically refers to many instances. For example, 'Car' can be considered a semantic type that refers to a vehicle with four wheels and an engine having instances such as "FORD EXPLORER"™, "TOYOTA COROLLA"™, "FORD FOCUS"™, etc.

Parts of speech (e.g., noun, verb, adverb, etc.) as well as syntactic constructs (e.g., verb phrase, a noun phrase, etc.) can also be construed as semantic types. Semantic types are associated with dictionaries, i.e., they typically provide enumerations of instances of the types. For example, a semantic type having a type label of 'Actor' could refer to a dictionary with "Tom Hanks", "Angelina Jolie", and numerous other entries.

The challenge of zeroing in on semantic types of particular interest (in the multitude of semantic annotations over a text corpus), gathering information about similarities and/or differences of their characteristics and contexts, displaying this information in a variety of ways intended to be revealing and descriptive of inner regularities, and tabulating collocations, frequencies, distribution and common features across semantic types of interest, is likely to result in information overload. There may be a number of annotations of the same type in a document, which might suggest by a common feature, and/or a similar context, certain semantic traits attributable to that type.

Typically, annotations over 'the same things' are scattered through a document making observations about common elements in their contexts very hard to collate and generalize from. Further, in the vicinity of annotations of interest, there may be numerous other annotations (e.g., different strings, different semantic types, and different feature characteristics), which, depending on the nature of a particular annotation viewer, may or may not expose the right set of descriptive and discriminating characteristics for making a generalization.

In at least one exemplary embodiment of the present invention, we assume that semantic annotations happen by some requisite machinery and that a type system mediates relationships among type, allowing for inferences such as but not limited to: in certain linguistic contexts Poets and Authors behave similarly. Ideas behind a KWIC index are extended to develop a type-based display of semantic instances in context. The resulting semantic concordance exposes semantic types (not unadorned strings), as primary objects mediating the organization of text fragments. Abstracting over strings, and observing commonalities in patterning of type labels allows for discovery of deep semantic relationships intrinsic in the text descriptions of the documents related to a domain.

FIG. 1 illustrates a method of generating and displaying a semantic type concordance according to an exemplary embodiment of the invention. Referring to FIG. 1, the method includes prompting a user for a semantic type and at least one text document (e.g., a document corpus) (S101), determining textual strings that correspond to the semantic type (S102), searching the documents for occurrences of the textual strings (S103), and displaying each occurrence of the textual string along with at least one neighboring word that precedes or follows the textual string (S104).

The method may be used by a domain expert in the process of defining a domain ontology, or by analytics developers, in the process of developing text analytics for texts within certain domains. The document corpus is assumed to be representative, or indicative, of the domain and its underlying semantics. Examples of the documents could include a set of articles covering numerous seasons of a particular sport, documentation (e.g., manuals, user guides, etc.) for classes of software applications, newspaper stories (e.g., covering for example, but not limited to, the arts, science, etc.)

A type system may describe the set of semantic types. The set of semantic types, the relationships between them, and the characteristics (properties) of the semantic types may be referred to as an ontology, which provides a basic vocabulary by means of which semantic relations can be described. Regular relationships can be determined betweens types based on regularities in the formulation of these in text. A tokenizer, a named entity detector, and a shallow/deep syntactic parser are examples of basic analytics that can deposit instances of semantic types (e.g., those mandated by a type system) in an annotation repository over which the semantic type concordance operates.

The semantic concordance may use a multi-dimensional index, associating string fragments of the underlying text stream in the corpus with one or more types annotated over the strings. Additionally an association may be maintained of document provenance, which may used to determine which document a concordance line (item) comes from.

Referring back to FIG. 1, the step (S101) of prompting a user for a semantic type assumes that one or more semantic types are predefined in storage of the type system for selection, from, for example, a list, a dropdown menu, etc. If no semantic types are currently available, or the user does not find an appropriate semantic type listed, a user interface may be presented to enable a user to define a new semantic type. For example, a choice labeled 'define new semantic type' could be presented to the user to initiate defining a new semantic type or such could be initiated automatically if no semantic types are present. One may define a new semantic type as a combination of existing types/subtypes, and in this way, the analytics for the new type may be composed from existing analytics for existing known types.

A semantic type may be decomposed into a combination of semantic sub-types and logical operators (e.g., a logic union, a logic intersection, negation, etc.). For example, the semantic type of 'Actor' could be defined by the union of semantic subtypes of 'Movie Actor' (e.g., in movies) OR 'Dramatic Actor' (e.g., in plays) OR 'Child Actor' (e.g., in performances at age 17 and under), etc. In the above example, if an instance of any of the semantic subtypes of the semantic type are found in a line of text, then a context of that text would be displayed in the corresponding semantic type concordance. In another example, text that needs to correspond to an instance in both semantic subtypes of 'Movie Actor' and 'Dramatic Actor' and not to an instance in 'Child Actor' could be defined by a semantic type of 'Actor' defined by ('Movie Actor' AND 'Dramatic Actor') AND '(!Child Actor'). Thus, in a further embodiment of the above-described user interface, defining of a semantic type could include selection of available semantic sub-types or their definition and selection of connecting logical operators. For example, when a user desires to create a new semantic type, the user may be presented with a list of available semantic subtypes and logical operators. For example, a user could select a first semantic subtype followed by a logic OR followed by a second semantic type to generate a semantic type defined as the union of the first and semantic subtypes. The user interface may also allow a user to construct a new semantic subtype in a similar manner to the construction of the semantic type. For example, the user could be prompted to enter a label for the new semantic subtype and instances of that semantic subtype.

Figure 2:
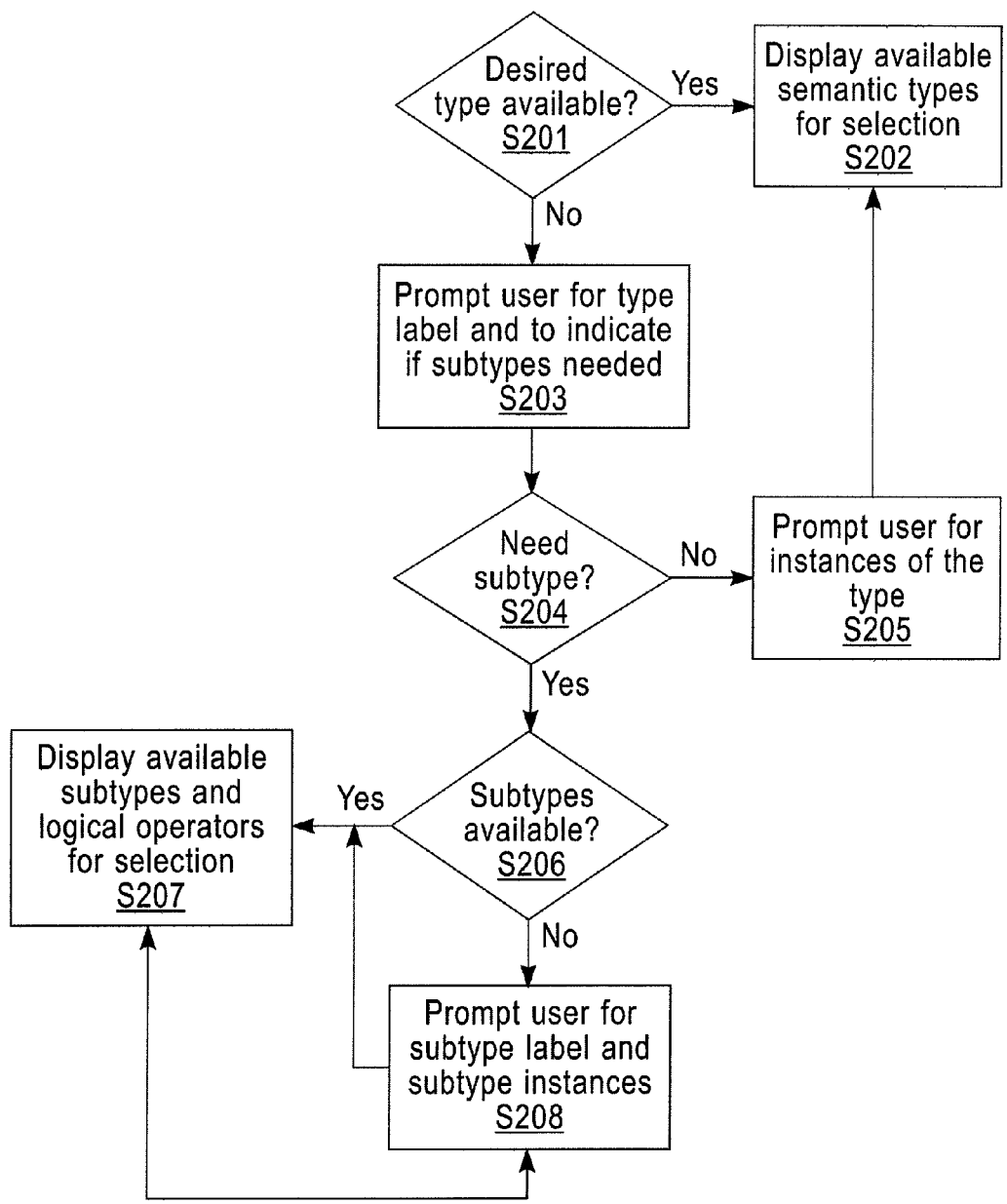
FIG. 2 illustrates a method of selecting a semantic type according to an exemplary embodiment of the invention that may be used in the method of FIG. 1.

FIG. 2 illustrates a method of prompting a user for a semantic type according to an exemplary embodiment of the present invention that may be used in step (101) of FIG. 1. A determination is made as to whether a desired semantic type is available (S201). For example, the determination could be made by searching for the existence of stored semantic types and/or receiving feedback from the user indicating that they desire to create a new semantic type. If stored semantic types are available, they can be displayed so that one or more can be selected by a user (S202).

If the user has indicated that they want to create their own semantic type or no semantic types are present, the user can be prompted for a label of the new semantic type and to indicate whether subtypes will be needed (S203). Based on the current user feedback, it can be determined whether a subtype will be needed (S204). If no semantic subtype is needed, then the can user can be prompted for instances of the semantic type (S205). The semantic type can then be added to the list of displayed semantic types for subsequent selection by the user. If it is determined that a semantic type is needed, a determination is made as to whether semantic subtypes are available (S206). If semantic subtypes are available, the semantic subtypes are displayed along with logical operators so that a user can select the semantic subtypes and logical operators that define the semantic type (S207). If no semantic subtypes are available or the user indicates that they desire to create a new semantic subtype, the user is prompted for a label of the semantic subtype and instances of the semantic subtype (S208). The new semantic subtype can then be added to the list of displayed semantic subtypes for user selection. Additional semantic subtypes may be created until the desired semantic subtypes have been added.

Figure 3:
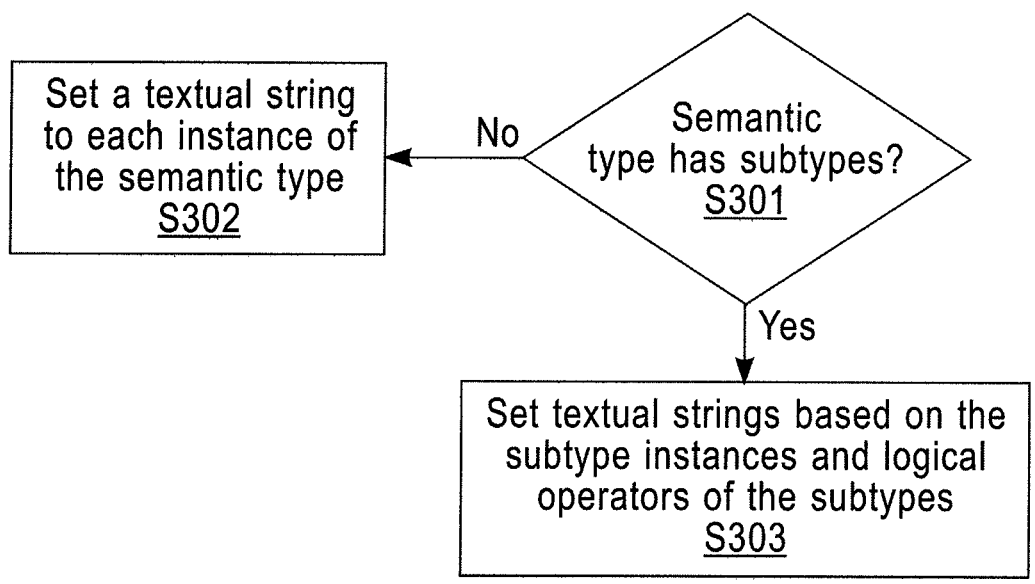
FIG. 3 illustrates a method of determining textual strings of a semantic type according to an exemplary embodiment of the invention that may be used in the method of FIG. 1.

Referring back to FIG. 1, a determination is made as to what textual strings correspond to the selected semantic type (S102). FIG. 3 illustrates a method of performing this determination according to an exemplary embodiment of the present invention. Referring to FIG. 3, it is determined whether the semantic type is composed of semantic subtypes (S301). If it is determined that the semantic type has no semantic subtypes, then a textual string can be set to each instance of the semantic type (S302). If it is determined that the semantic type has semantic subtypes, then textual strings are set based on the composition of instances of the subtypes according to the corresponding logical operators (S303). For example, if the semantic type is 'Actor' defined by the union of 'Movie Actor', 'Dramatic Actor', and 'Child Actor', then textual strings are set to the instances of 'Movie Actor', 'Dramatic Actor', and 'Child Actor'. For example, if 'Movie Actor' includes instances of {"Tom Hanks" and "Meg Ryan"), 'Dramatic Actor' includes instances of {"Kenneth Ard" and "Betty Buckley"}, and 'Child Actor' has instances of {"Selena Gomez" and "David Henrie"}, then a textual string would be set to each actor's name.

Referring to FIG. 1, a search of the documents is then performed for occurrences of the determined textual strings (S103). Then each occurrence of each textual string along with at least one neighboring word that precedes or follows the textual string in the corresponding document is displayed on the concordance display (S104). These neighboring words are contexts for the corresponding textual string. Characters or words to the left of a displayed textual string may be referred to as the left context and characters or words to the right of displayed textual string may be referred to as the right context. In at least one embodiment, each line of the display is organized around three elements (e.g., a central (focus) column, showing strings annotated with a semantic type, the left context and the right context). In an alternate embodiment, either the left or right context may be hidden from view. For example, the user interface may include a choice that enables a user to set which of these contexts is to be currently displayed. The selection of types of annotations (semantic types) to be displayed (e.g., in columns) may be controlled by appropriate set enumeration and/or list filtering affordances. Users may choose, for example, only to view instances of "Write" verbs (suppressing all others), to view "Write" and "Publish" verbs, or to view all but "Create" verbs. Further filtering may be based on, for example, certain subsets of documents.

Display of a semantic type concordance is dynamically modifiable and thus allows one to dynamically change between various viewing perspectives for viewing the data, which allows for regularities/irregularities in semantic type behavior to be more easily discovered. The user interface can be modified to enable a variety of contexts to be viewed in which a given semantic type (or combination of semantic types) appear. The user interface may be modified to include additional controls for sorting over subsets of columns, with the focus of sorting on, for example the context to the left of the semantic type mentioned, or the context within the right edge of the semantic type mentioned. For example, sorting of a right-to-left character sequence (right-to-left sort) can take place, where one looks at the last word on the right (of the strings in the left context column or any other column), and sorts over those words, and ties are resolved by looking at the sorting sequence of the last-but-one word, and so on. A left-to-right sort can include sorting by the first word in a column. For the purpose of discovering semantic relationships, it is helpful to be able to see the collocation of semantic types. Accordingly, by sorting with the appropriate focus (conceptually at the edge of abutting types), the user is, in effect, requesting additional evidence for such a co-occurrence being observed at other parts of the corpus.

FIG. 4 shows an embodiment of a multi-modal display of correlated instances of semantic annotations according to an exemplary embodiment of the present invention. Referring to FIG. 4, a user interface 400 includes a filename column 401, a semantic type column 402, a left context column 403, an instance column 404, a right context column 405, a document filter 406, and a concept filter 407.

For example, the textual strings such as "HONDA"™ and "NISSAN"™ in the instance column 404 are instances of the semantic type "Car" of the semantic type column 402. The left context column 403 includes the text that precedes an instance of a semantic type in the semantic type column 402 and the right context column 405 includes the text that follows the instance. The user interface 400 may be adapted to enable a user to specify the number of displayed characters or words of the left context column 403 and/or the right context column 405. The file name column 401 lists the filename from where the corresponding left context, instance, and right context are derived.

The document filter 406 can be used to show/hide items of the concordance based on the various selected/unselected documents of the document corpus. The concept filter 407 can be used to show/hide items of the concordance based on the selected/unselected semantic types.

FIG. 5 shows an embodiment of a multi-modal display of correlated instances of semantic annotations with semantic subtypes according to an exemplary embodiment of the present invention. Referring to FIG. 5, a user interface 500 includes a filename column 501, a semantic type column 502, a left context column 503, an instance column 504, a right context column 505, a document filter 506, and a concepts filter 507. For example, the textual strings such as "Burt Reynolds", "Doris Day" from the instance column 504 are instances of the semantic subtype "Actor" from the semantic type column 502, and the textual strings such as "Bob Dylan" and "Chaucer" in the instance column 504 are instances of the semantic type "Artist" from the semantic type column 502.

The filename column 501, semantic type column 502, contexts 503, and 505, instance column 504, and document filter function in a similar manner to their counterparts in FIG. 4. The concept filter 507 additionally enables a user to show/hide items of the concordance that correspond to the constituent semantic subtypes of a semantic type. In the example shown in FIG. 5, "Artist" is a semantic type defined by the union of semantic subtypes "Actor", "Author", "Director", "Poet", etc. In this example, different items of the concordance for the semantic type "Artist" can be shown/hidden by a user selecting/deselecting the checkboxes of each of the constituent semantic types.

The order in which the columns of data are displayed in the user interfaces (e.g., 400 or 500) is merely an example, and can be modified as desired. Further, not all of the columns need be displayed. For example, the user interfaces (e.g., 400 and 500) may be adapted to only display the left context column, only display the right context column, suppress display of the filename column, suppress display of the semantic type column, suppress display of the filters, etc.

After a developer defines their semantic types, defines their text corpus, and generates the corresponding semantic type concordance, they may find that their implementation needs to be modified based on the current concordance results. The developer can then make changes to the semantic types and/or redefine the text corpus to generate new concordance results. While FIGS. 4 and 5 shows display of a single semantic type concordance, in an alternate embodiment, the concordance display is modified to display two semantic type concordances side-by-side (i.e., the previous concordance and the current concordance). The modified concordance display can be deployed as a 'concordance-difference', highlighting areas of change, and facilitating examination of all the 'before' and 'after' differences, which aid the developer in determining whether their changes are improvements. The modified concordance display can align the data of the previous and current concordances that are the same. For example, if a previous concordance listed items 1, 2, and 3, and a current concordance only lists items 1 and 3, then the side-by-side concordance could list items 1, 2, and 3 respectively on lines 1, 2, and 3 on the left side, item 1 on line 1 on the right side, a blank line on line 2 on the right side, and item 3 on line 3 on the right side. The blank line is a visual indicator that the revised analytics component is missing a prior analytical capability. This missing capability could indicate a degradation in performance or alternately an improvement in performance. In any event, the concordance-difference modality allows one to detect such differences to aid in optimization.

Figure 6:
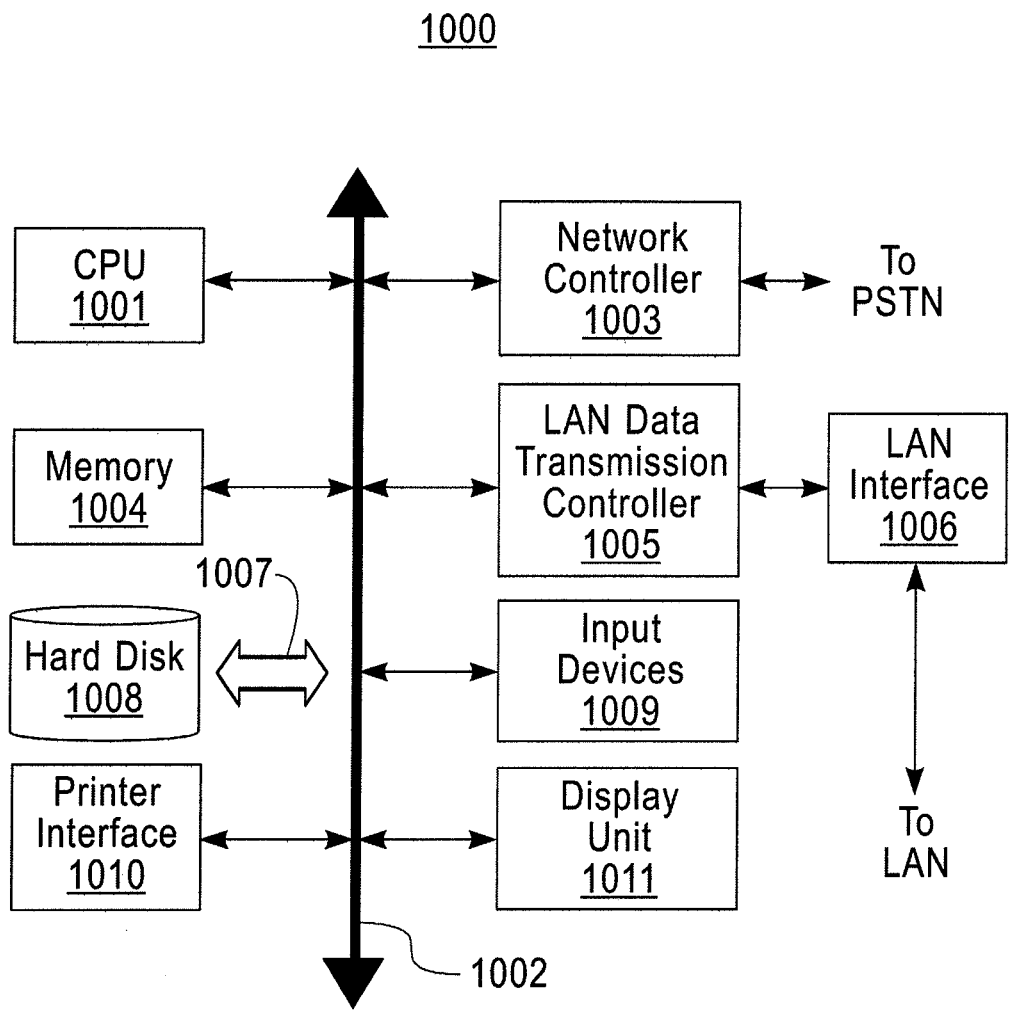
FIG. 6 is shows an example of a computer system capable of implementing the methods according to embodiments of the invention.

FIG. 6 illustrates an example of a computer system, which may enable definition and storage of semantic types, semantic subtypes, a corpus of text documents, and generation and display of corresponding semantic type concordances, according to exemplary embodiments of the invention. For example, the methods of FIGS. 1-3 may be implemented in the form of a software application running on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. The display unit 1011 may display any of the above-described user interfaces and concordances. As shown, the system 1000 may be connected to a data storage device, for example, a hard disk 1008, via a link 1007. CPU 1001 may be the computer processor that performs the above described methods (e.g., those of FIGS. 1-3), which enable the user to enter data for generation and display of the semantic type concordance.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. An apparatus comprising a data processing system for generating and displaying a semantic type concordance, the data processing system comprising:
   a memory storing a computer program;
   a display to display data of a concordance generated by the program;
   a processor configured to execute the computer program, wherein the computer program includes instructions for:
      displaying a graphical user interface, in a first area on the display, configured to enable a user to select at least one semantic type from a list of a plurality of semantic types and select at least one text document from a list of a plurality of text documents, wherein each semantic type maps to at least two different textual strings;
      displaying, within the first area, a list of available semantic subtypes in an expanded hierarchical view for each selected semantic type, wherein the first area enables at least two semantic subtypes to be selected by the user for each selected semantic type, wherein each selected semantic type is updated to be defined by the logical union of the selected constituent semantic subtypes;
      generating a concordance of each selected document based on the selected semantic types, wherein the concordance uses a multi-dimensional index that associates strings within each selected document with one or more semantic types annotated over the strings; and
      displaying data of the generated concordance in a second area of the graphical user interface on the display while the list of available semantic subtypes is displayed in the first area,
      wherein the displayed concordance includes a first column displaying the selected semantic types found within the selected documents, a second column displaying the at least two strings found within the selected documents that map to the displayed semantic types, and a third column displaying a context string of the displayed strings within their respective documents, and
      wherein the displayed concordance includes a row comprising a first label identifying one of the selected documents and a second label identifying one of the selected semantic types, only when one of the strings that map to both a first semantic subtype and a second semantic subtype of the one selected semantic type is found within the one selected document, and the same row includes the one string and strings that appear immediately before or after the one string in the one document, and
      wherein the computer program is configured to dynamically refine the displayed concordance in response to user selections within the first area to at least one of: the list of semantic types, the list of documents, or the list of semantic subtypes.

2. The apparatus of claim 1, wherein the display is configured to display data of a previous concordance and a current concordance side by side and items of the data that are the same in the previous concordance and the current concordance are aligned.

3. The apparatus of claim 2, wherein items of the data that are different among the previous and current concordances are highlighted.

4. The apparatus of claim 1, wherein each context string is at least one punctuation character or a word preceding or following the corresponding at least two strings in the corresponding document.

5. The apparatus of claim 4, wherein the third column comprises a left-context column disposed to the left of the second column and having the context strings including the at least one punctuation or words that precede the at least two strings and a right-context column disposed to the right of the second column and having the context strings including the at least one characters or words that follow the at least two strings.

6. The apparatus of claim 5, wherein the user interface includes a sorting option that enables rows of the displayed data to be sorted by a selected one of the columns.

7. The apparatus of claim 6, wherein the sorting option is one of a left-to-right sort and a right-to-left sort, wherein the left-to-right sorts by a first word of the selected column, and the left-to-right sort sorts by a last word of the selected column.

8. The apparatus of claim 1, wherein the computer program further includes instructions for dynamically updating the displayed concordance in response to the user deselecting one of the previous selections or making a new selection.

9. A method of generating and displaying a semantic type concordance in a data processing system, the method comprising:
 prompting, by a graphical user interface of the data processing system, in a first area on a display, a user to select at least one semantic type from a list of a plurality of semantic types and to select at least one text document from a list of a plurality of text documents;
 displaying, within the first area, a list of available semantic subtypes in an expanded hierarchical view for each selected semantic type, wherein the first area enables at least two semantic subtypes to be selected by the user for each selected semantic type, wherein each selected semantic type is updated to be defined by the logical union of the selected constituent semantic subtypes;
 determining, by the data processing system, at least two different textual strings that map to each of the selected semantic types;
 searching, by the data processing system, the documents for occurrences of the at least two textual strings;
 generating, by the data processing system, a concordance of each selected document based on the selected semantic types, wherein the concordance uses a multi-dimensional index that associates strings within each selected document with one or more semantic types annotated over the strings;
 displaying data of the generated concordance in a second area of the graphical user interface on the display while the list of available semantic subtypes is displayed in the first area,
 wherein the displayed concordance includes a first column displaying the selected semantic types found within the selected documents, a second column displaying the at least two strings found within the selected documents that map to the displayed semantic types, and a third column displaying at least one neighboring word that precedes or follows the corresponding displayed strings within their respective documents,
 wherein the displayed concordance includes a row comprising a first label identifying one of the selected documents and a second label identifying one of the selected semantic types, only when one of the strings that map to both a first semantic subtype and a second semantic subtype of the one selected semantic type is found within the one selected document, and the same row includes the one string and strings that appear immediately before or after the one string in the one document, and
 wherein the data processing system is configured to dynamically refine the displayed concordance in response to user selections within the first area to at least one of: the list of semantic types, the list of documents, or the list of semantic subtypes.

10. The method of claim 9, further comprising:
 modifying one of the semantic types to define a new semantic type;
 determining, by the data processing system, new textual strings that correspond to the new semantic type;
 searching, by the data processing system, the documents for occurrences of the new textual strings; and
 displaying, on the display of the data processing system, each occurrence of the new textual string along with at least one neighboring word that precedes or follows the new textual string as a current concordance along side of the previous concordance.

11. The method of claim 9, further including dynamically updating the graphical user interface in response to the user deselecting one of the previous selections or making a new selection.

12. The method of claim 9, wherein the third column comprises a left-context column disposed to the left of the second column and having the at least one neighboring word that precedes the corresponding displayed strings and a right-context column disposed to the right of the second column and having the at least one neighboring word that follow the corresponding displayed strings.

13. The method of claim 12, wherein the graphical user interface includes a sorting option that enables rows of the displayed data to be sorted by a selected one of the columns.

14. The method of claim 13, wherein the sorting option is one of a left-to-right sort and a right-to-left sort, wherein the left-to-right sorts by a first word of the selected column, and the left-to-right sort sorts by a last word of the selected column.

* * * * *